US 9,251,286 B2
Feb. 2, 2016

(12) United States Patent
Marston (10) Patent No.: US 9,251,286 B2
(45) Date of Patent: Feb. 2, 2016

(54) FORM ATTACHMENT METADATA GENERATION

(75) Inventor: Cayce Benjamin Marston, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 1691 days.

(21) Appl. No.: 12/173,588

(22) Filed: Jul. 15, 2008

(65) Prior Publication Data

US 2010/0017426 A1     Jan. 21, 2010

(51) Int. Cl.
G06F 17/30     (2006.01)
G06F 17/22     (2006.01)
G06F 17/24     (2006.01)

(52) U.S. Cl.
CPC ...... *G06F 17/30896* (2013.01); *G06F 17/2229* (2013.01); *G06F 17/2247* (2013.01); *G06F 17/243* (2013.01); *G06F 17/30011* (2013.01)

(58) Field of Classification Search
None
See application file for complete search history.

(56) References Cited

U.S. PATENT DOCUMENTS 5,600,828 A * 2/1997 Johnson et al. ............... 707/758
7,113,948 B2   9/2006 Jhingan et al.
7,162,691 B1 * 1/2007 Chatterjee et al. ............ 715/205
7,568,101 B1 * 7/2009 Catorcini et al. ............. 713/176
2002/0120634 A1 * 8/2002 Min et al. ...................... 707/200
2005/0273708 A1 * 12/2005 Motyka et al. ................ 715/515

FOREIGN PATENT DOCUMENTS

WO     2007011735 A2     1/2007

OTHER PUBLICATIONS

Honkala et al., Secure Web forms with Client-Side Signatures, Jul. 2005, Springer Science+Business Media, 12 Pages.*
Honkala et al., ICWE 2005 Secure Web forms with Client-Side Signatures, 2005, Telecommunications Software and Multimedia Laboratory—Helsinki University of Technology, 31 pages.*
Attardi et al., "Self Reflection for Adaptive Programming", LNCS 2487, Springer-Verlag Berlin Heidelberg 2002, pp. 50-65.

* cited by examiner

*Primary Examiner* — Hung Q Pham
(74) *Attorney, Agent, or Firm* — Yee & Associates, P.C.; Ryan Lewis (57) ABSTRACT

Illustrative embodiments provide a computer implemented method, a data processing system, and a computer program product for form attachment metadata generation. In one illustrative embodiment, the computer implemented method receives a request to attach an attachment to a document, and calls an attachment metadata generator to extract metadata from the attachment to form extracted data. The computer implemented method further generates an extensible markup language fragment from the extracted data, and inserts the extensible markup language fragment into the document.

20 Claims, 5 Drawing Sheets

```
<xforms:model>
<xforms:instance id="INSTANCE" xmlns="">
<data>
<AttachmentMetaData>
<FileInfo EncodedSize="3006390" FileExtension=".jpg" FileName="IMG_2407.JPG"
MimeType="image/jpeg" NativeSize="2201909" SID="PAGE1.IMG_1"></FileInfo>
<CameraMake>Canon</CameraMake>
<CameraModel>Canon PowerShot SD 600</CameraModel>
<DateTime>2006:09:15 07:07:16</DateTime>
<ImageArtist>Cayce Marston</ImageArtist>
<ImageCopyrightHolder>Cayce Marston</ImageCopyrightHolder>
<ImageDescription>Sunshine Through Trees in Alaska</ImageDescription>
<EXIFImageWidth>2816</EXIFImageWidth>
<EXIFImageHeight>2112</EXIFImageHeight>
<DigitalZoomLevel>1.00 x</DigitalZoomLevel>
<GPSData>
<Latitude>58.722 N</Latitude>
<Longitude>135.27558 W</Longitude>
<Heading>34</Heading>
<Speed>0.0</Speed>
<NumberOfSatellitesUsedForTriangulation>4</NumberOfSatellitesUsedForTriangulation>
</GPSData>
</AttachmentMetaData>
</data>
</xforms:instance>
</xforms:model>
```

FORM ATTACHMENT METADATA GENERATION

BACKGROUND OF THE INVENTION

1. Field of the Invention

The present invention relates generally to an improved data processing system and, more specifically, to a computer implemented method, an apparatus, and a computer program product for form attachment metadata generation.

2. Description of the Related Art

A typical use of forms in the workplace involves attachment of supporting documents, such as images and productivity documents, as enclosures. Digital signatures are often applied to the entire document, including any attachments, to provide a secure and tamper-proof transaction record.

Currently, there is no insight into the information about the attachments that are stored within a forms document. The lack of information regarding the attachments can be a significant issue when thousands or millions of forms are involved. Each of the stored forms may contain one or more attachments. The forms may be stored within data repositories such as a content manager or a data base manager product.

Currently, the only means to obtain information that describes each attachment, such as the information that may form attachment metadata, is to write custom code in the application tier to programmatically extract each attachment upon form submission. The custom coding in the application tier is required to capture the attachment information prior to document storage into the data repository. Another choice may be to write a custom application to crawl through the repository subsequent to form submission, sequentially extracting and processing the form attachments, creating and establishing links between the extracted information and the identifiers, and/or other data within the form. An additional challenge with the crawl approach is the need to separately store the information into the database or repository. This methodology does not conform to a document-centric architecture. As another option, a user may manually open and inspect each form. The user would sequentially extract and examine each attachment with the associated program using appropriate tools, such as an image viewer for image attachments, for example. Previously, valuable information has been locked away inside binary and proprietary attachments enclosed within the forms documents. Additionally, to be considered valid extensible markup language (XML), these attachments are maintained in a "gzip" and "base64encoded" format, adding additional layers of abstraction to the original data.

The software application, "gzip" is used for file compression and refers to the GNU zip program. The program is a free replacement for a previously used compress program in Unix-based operating systems. The encoding method "base64encoded" converts binary data into American Standard Code for Information Interchange ASCII text, and vice versa, and is one of the methods used by multipurpose Internet mail extensions (MIME). Base64 divides each three bytes of the original data into four 6-bit units, which it represents as four 7-bit ASCII characters. This typically increases the original file by about a third of the original size.

BRIEF SUMMARY OF THE INVENTION

According to one embodiment of the present invention, a computer implemented method for form attachment metadata generation is provided. The computer implemented method receives a request to attach an attachment to a document, calls an attachment metadata generator, and extracts metadata from the attachment to form extracted data. The computer implemented method further generates an extensible markup language fragment from the extracted data, and inserts the extensible markup language fragment into the document.

In another illustrative embodiment, a data processing system for form attachment metadata generation is provided. The data processing system comprising a bus, a memory connected to the bus, wherein the memory comprises computer-executable instructions, a communications unit connected to the bus, a display connected to the bus, a processor unit connected to the bus, wherein the processor unit executes the computer-executable instructions to direct the data processing system to receive a request to attach an attachment to a document, call an attachment metadata generator, extract metadata from the attachment to form extracted data, generate an extensible markup language fragment from the extracted data, and insert the extensible markup language fragment into the document.

In another illustrative embodiment, a computer program product for form attachment metadata generation is provided. The computer program product comprises a computer-readable recordable type medium, tangibly embodying computer-executable instructions thereon. The computer-executable instructions comprise computer-executable instructions for receiving a request to attach an attachment to a document, computer-executable instructions for calling an attachment metadata generator, computer-executable instructions for extracting metadata from the attachment to form extracted data, computer-executable instructions for generating an extensible markup language fragment from the extracted data, and computer-executable instructions for inserting the extensible markup language fragment into the document.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present invention may be written in any combination of one or more programming languages, including an object-oriented programming language such as Java™, Smalltalk, C++, or the like, and conventional procedural programming languages, such as the "C" programming language, or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer, or other programmable data processing apparatus, to function in a particular manner, such that the instructions stored in the computer-readable medium produce an article of manufacture, including instruction means, which implement the function/act specified in the flowchart and/or block diagram block or blocks.

The computer program instructions may also be loaded onto a computer, or other programmable data processing apparatus, to cause a series of operational steps to be performed on the computer, or other programmable apparatus, to produce a computer implemented process, such that the instructions which execute on the computer, or other programmable apparatus, provide processes for implementing the functions/acts specified in the flowchart and/or block diagram block or blocks.

Figure 1:
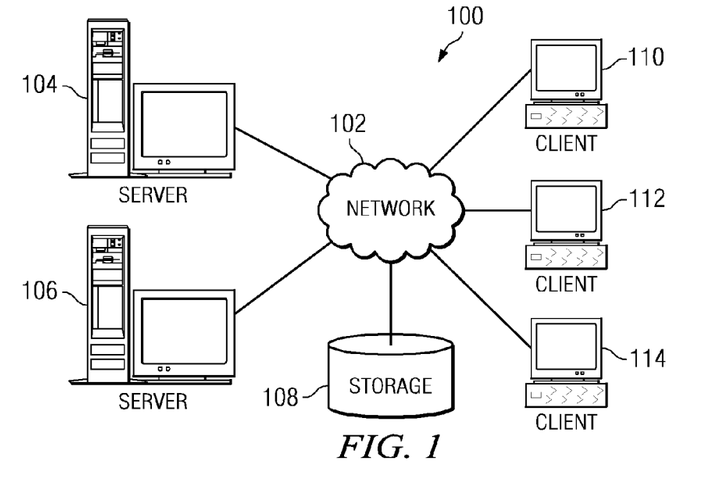
FIG. 1 is a pictorial representation of a network of data processing systems in which illustrative embodiments may be implemented.
Figure 2:
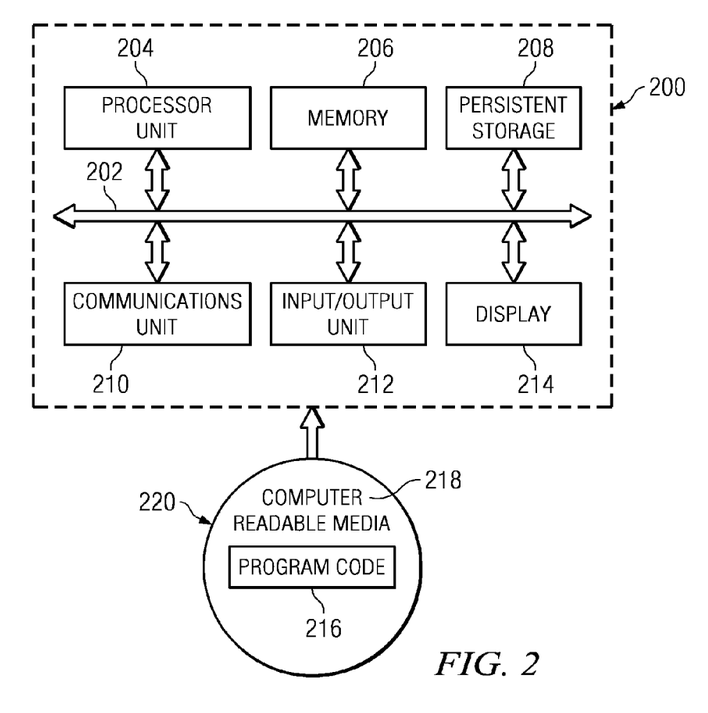
FIG. 2 is a block diagram of a data processing system in which illustrative embodiments may be implemented.

With reference now to the figures, and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example and not as an architectural limitation for the different illustrative embodiments.

Using system 100 of FIG. 1, an example of using an attachment manager may be provided. A user on client 110 desires to attach a file to a document and place the combination in a storage location on server 104 through network 102. The user invokes the processing of attachment manager when an attachment operation is commenced. The attachment process may be performed on client 110 or server 104. The attachment must be accessible to the process. The attachment manager invokes an extractor to pull data describing the attachment from the attachment. The data pulled is then input to a generator to create an extensible markup language based output that describes the document attachment. The document, the attachment, and the generated output are filed with a digital signature as a package to complete the process.

With reference to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
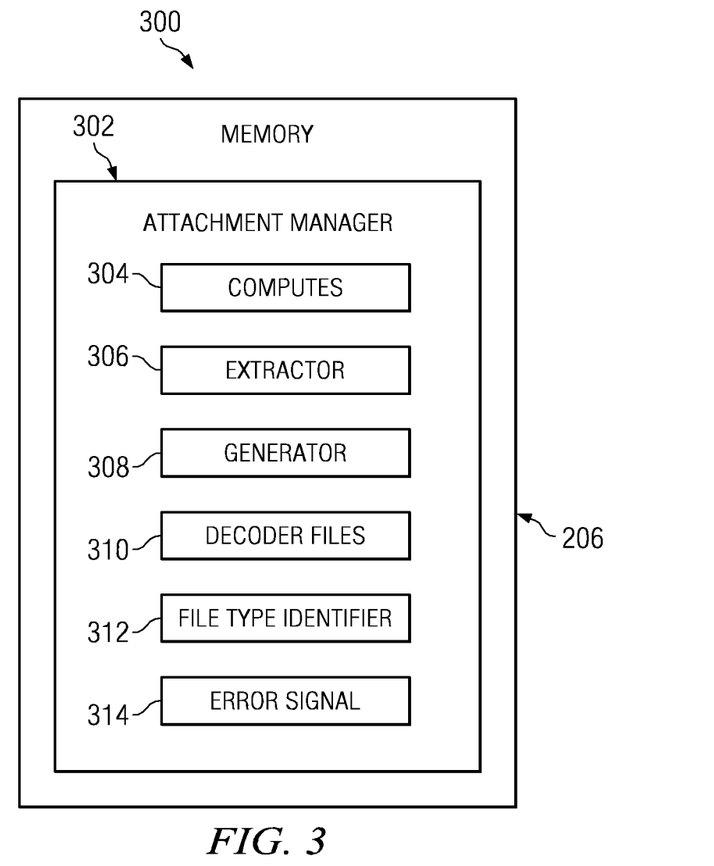
FIG. 3 is a block diagram of components of an attachment manager in accordance with illustrative embodiments.

With reference to FIG. 3, a block diagram of components of an attachment manager in accordance with illustrative embodiments is shown. Attachment management system 300 depicts attachment manager 302 comprising computes 304, extractor 306, generator 308, decoder files 310, file type identifier 312, and error signal 314 contained within memory 206. Memory 206 is within system 200 previously shown in FIG. 2.

Attachment manager 302 provides a focal point for the capabilities of the various components within. Computes 304 provides the logic or function of form controls, or user interface components, that deal with interactive data entry and display. For example, a "trigger" computes may be defined to initiate an action on an event occurrence such as, the in-form logic to trigger the processing of an attachment based on a user event.

Extractor 306 provides a capability to obtain specific data from a file or object being attached. An extractor may be specific to a file type or may be composed of selectable units, such as decoder files 310, each of which is file-type specific. Extractor 306, if implemented separately, or decoder files 310 have knowledge of the data structure of the attachment to facilitate the processing of the attachment. Decoder files 310 implement a common programming interface to enable similar information to be passed in the call over the various decoders supported.

The decoder file selection is performed based on analysis provided by file type identifier 312. File type identifier 312 provides a mapping of a file extension of the attachment file or object to a decoder file. Generator 308 provides a capability to create output from the extracted information, derived from extractor 306, in an extensible markup language form.

In an alternative embodiment, decoder files 310 may be included with a software component such as extractor 306 or attachment manager 302 as a collection rather than as separate files. The set of modules in the collection provide the same capabilities of the separate files, but in one offering or project. Therefore, the decoder function may be a collection of class files or modules offered as a unit rather than individually as a matter of installation preference.

Should an error occur and need to be reflected to the caller, error signal 314 provides the capability to handle the error situation and notify the caller. Error signal 314 typically handles an error caused by a file type not found or a decoder file not found situation. Notification may then be made to the caller, whether a user or another component of the system using typical notification support from the user interface or call interface components.

Figure 4:
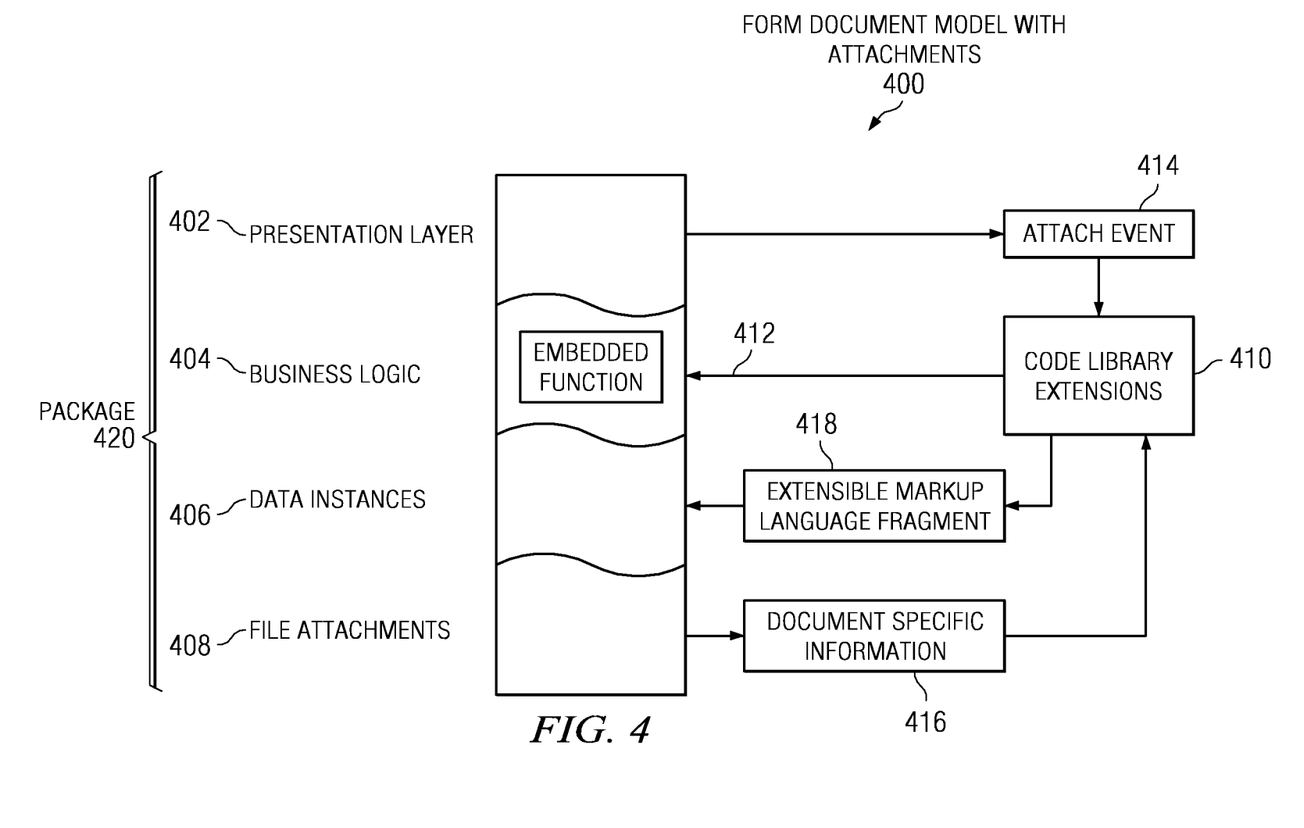
FIG. 4 is a block diagram of a form document model with attachments, in accordance with illustrative embodiments.

With reference now to FIG. 4, a block diagram of a form document model with attachments, in accordance with illustrative embodiments, is shown. Form document model with attachments 400 comprises a layered structure in which form-based information may be presented, maintained and processed. Presentation layer 402 comprises information necessary for the desired look and feel of the form presented to a user. Presentation layer 402 typically comprises tagged information using a markup language, needed for placement of data in a desired layout, or style, of form-based information.

Business logic 404 defines and codifies the business needs with respect to the forms data. For example, the fields for collecting name and address information on the form may be used to provide data into a personnel database, or a computation may be performed on rate and hours worked input values to provide a gross earnings component output.

Data instances 406 provide the specification of the data structures in support of the form being processed. For example, each field of the form would have a corresponding data definition provided to describe the type of data and placement within the data hierarchy of the form data.

File attachments 408 provides a capability to describe various added documents or data that may be appended to the information captured by the form through input fields. The attachment type and size may vary depending upon the type of information to be collected in the form and the application. For example, in an insurance claim application the report for a motor vehicle accident may be expected to append, or attach, photographs of the accident scene and vehicle. In a similar manner, an expense claim form may have various attachments in the form of receipts.

Workplace Forms, available from International Business Machines Corporation, and XForms documents are examples of structured extensible markup language files. These files provide separation of user interface (UI), data model, and application logic. The forms implementation typically results, therefore, in a document view comprising a four-layer object having a presentation layer, a business logic layer, data instances layer and a file attachment layer as just described. The number of data instances in the data layer is extensible. The combination of data comprising the four layers provides a complete package 420 of information regarding the form and supporting documentation of the attachment.

Using the just described, four-layer model of form document model with attachments 400, in combination with elements of FIG. 3, a high-level data flow may be described. In an example, the forms are self-describing, structured documents that can be designed to incorporate declarative logic. The logic can be triggered based on events within the form, such as when entering or exiting a field, modifying a value or property, or enclosing an attachment within the form. Event flow typically begins when a user, or automated process, attaches a file to a form document. The completion of the attach event is detected. A call is made to an attachment metadata generation form application extension. The application extension may be embedded within the form or distributed with a forms viewer.

For example, using the accident report scenario, a user may select a check box, incorporating a computes 304 of FIG. 3, embedded in a form to indicate the desire to add an attachment. The selection of the embedded function 412 triggers an attach event 414 that utilizes a forms application extension, or perhaps an Internet form extension (IFX), from a local Java or C code library in the form of code library extensions 410. Code extensions library 410 may be used to contain elements 306-312 of attachment manager 302 of FIG. 3. The function call interface is provided by the typical forms application programming interface and the call interface extensions are known as Internet form extensions. The event may also call an attachment metadata generation service, implemented as a web service, as an alternative implementation. The metadata generation service, returns and stores the resulting extensible markup language fragment 418 into the form data model within data instances 406.

This approach makes the form self-describing with regards to an enclosed attachment. Document specific information 416 is used in the generation of the metadata and is based on the type of document that is being attached. For example, when handling image files, which are often used as supporting documents for insurance claim forms or documentation, an image file handler, such as decoder files 310 of FIG. 3, is required. For example, digital image files encode a range of information in an exchangeable image file format (EXIF) header. The data encoded in an exchangeable image file format header is different than information encoded in a video file or productivity document.

The forms application extension then ascertains the type of file enclosed, the attachment type, using file type identifier 312 of FIG. 3, and selects an appropriate decoder file based on the file type from decoder files 310 of FIG. 3. The attachment containing document specific information 416 is then read and processed, by extractor 306 of FIG. 3 to extract the metadata describing the object. Extensible markup language fragment 418 is then generated using the attachment metadata. The generated extensible markup language fragment 418 comprising the attachment metadata is then written, into the form data model.

For example, when using an image file, which is often used as a supporting document for insurance claim forms, the digital image files usually encode a range of information in an "EXIF" header within the image file. Potential information that is contained in the file header and a candidate for extraction into the form data model includes attributes such as date and time of original data generation, type of device, image size values, image description, and many more elements. For more information on image file-header composition refer to http://www.exif.org for complete specifications.

The information encoded within other file types will be different; however, the concept is the same. The appropriate discrete decoder files will be used to generate metadata for each respective file type. Each of these decoder files will implement a common application programming interface. The interface enables other decoders to be used when available, providing an extensible approach to support different file types, as required, or when additional or new decoders become available.

Since metadata is generated at the time the attachments are enclosed, digital signatures are not invalidated. The described technique works well with a forms-based document-centric approach to e-forms or electronic forms. The process also supports both online and disconnected operations.

Figure 5:
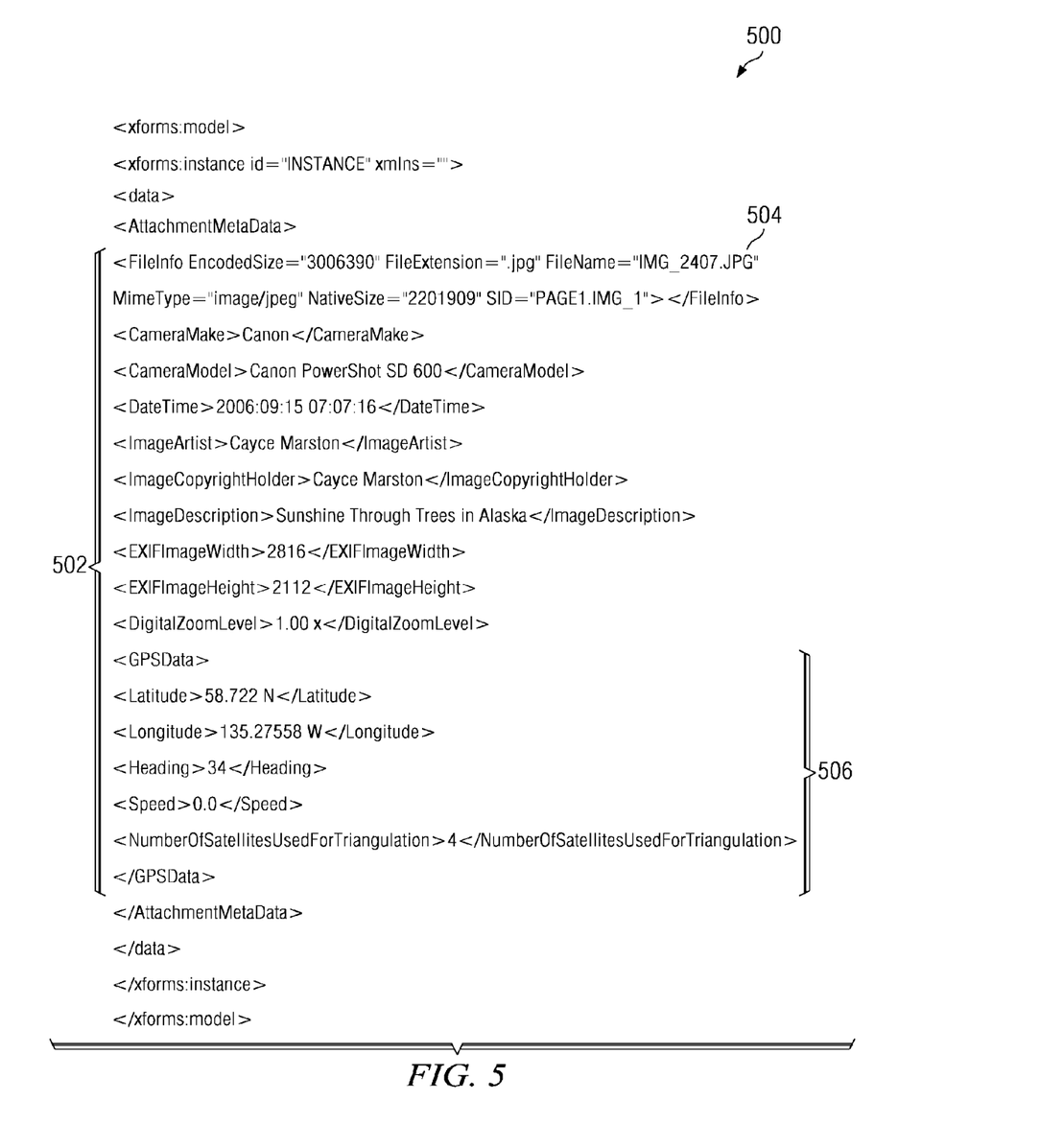
FIG. 5 is an example of attachment metadata using a Worldwide Web Consortium compliant combination of extensible markup language and extensible markup language forms instance, in accordance with illustrative embodiments.

With reference to FIG. 5, an example of attachment metadata using a Worldwide Web Consortium compliant combination of extensible markup language and extensible markup language forms instance is shown. The extensible markup language forms model example 500 provides one potential implementation of metadata extraction for one specific file type. What may have been previously encoded as a binary or proprietary data section of data within the form is now exposed in standards-based, extensible markup language. The generated information is shown in fragment 502. For example, each enclosed attachment will be represented within a respective AttachmentMetaData tagged element within the extensible markup language forms model. The specific metadata for a given attachment will depend on the type of file and available information. The example metadata was generated based on an image file for a photo taken in Alaska. The file type information may be seen in the "FileExtension" section of element 504. In another section, element 506 depicts global positioning system information. The generated attachment information has been stored within data instances 406 of form document model with attachments 400 of FIG. 4.

Figure 6:
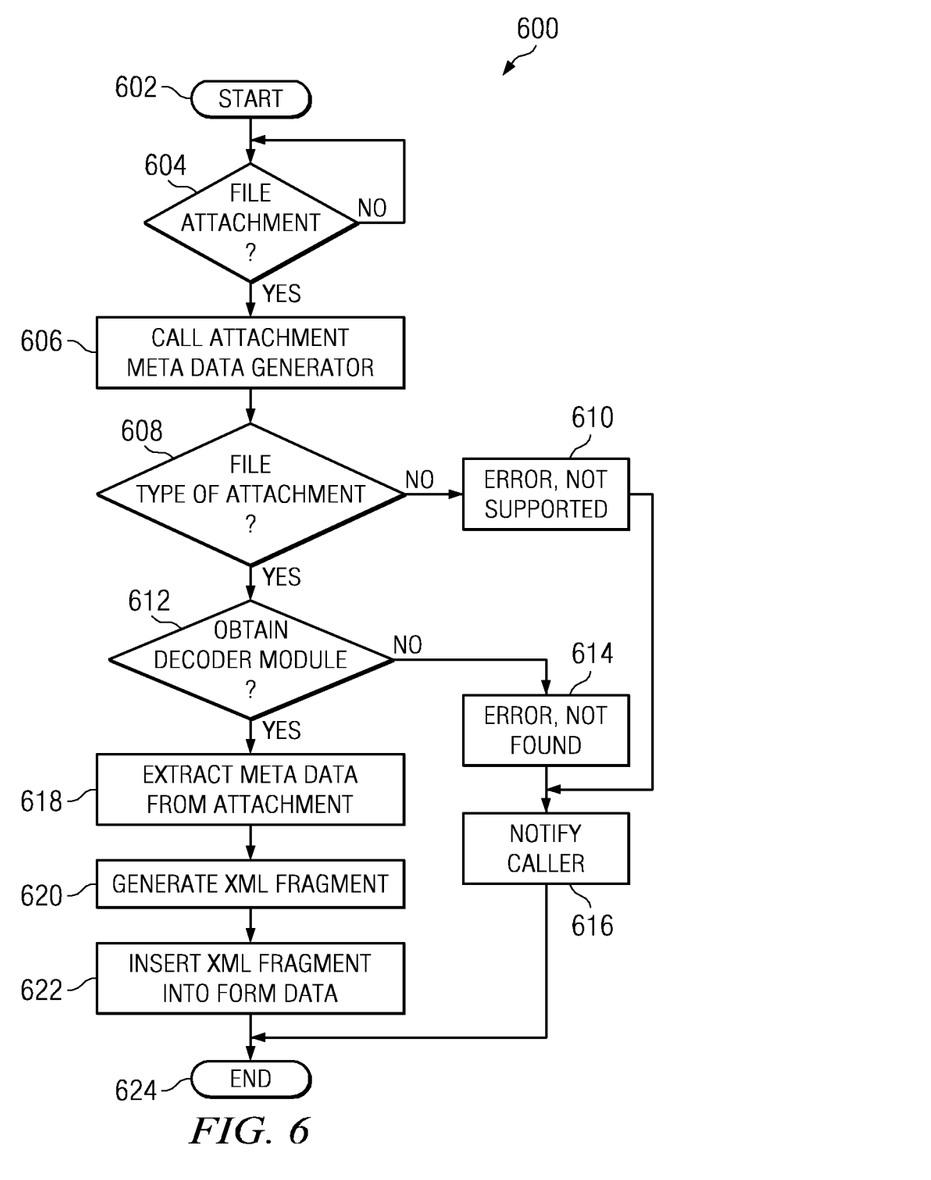
FIG. 6 is a flowchart of an attachment management process, in accordance with illustrative embodiments.

With reference to FIG. 6, a flowchart of an attachment management process, in accordance with illustrative embodiments is shown. Attachment management process 600 is an example of the use of attachment manager 302 of FIG. 3.

Process 600 starts (step 602) and determines if a file attachment is requested (step 604). When a file attachment is requested, a "yes" results. When there is no file attachment request, a "no" results. When a "no" is obtained in step 604, process 600 loops back to repeat step 604. When a "yes" is obtained in step 604, a call to an attachment metadata generator contained within code library extensions 410 of FIG. 4, is made (step 606). The call is typically triggered by a form-based event such as a user selecting the addition of an attachment, as in attach event 414 requested by embedded function 412 from code library extensions 410 of FIG. 4.

A determination is made as to whether a file type of the requested file attachment exists (step 608). The file type identifier function may be used to identify and locate the file type of the object being attached. The file type extension is typically mapped to a corresponding decoder. In an illustrative embodiment using elements of FIG. 3 again, file type identifier 312 is used to determine a file type and appropriate decoder files 310 selection. When no file type is provided or recognized, a "no" is obtained. When a supported file type is determined, a "yes" result is obtained.

When a "no" is obtained in step 608, error not supported signal is created (step 610). Notify caller is performed (step 616). Notification may be provided to a user or programmable service as required. Error handling and notification may typically be provided using the usual services of the code library and user interface being used. Custom coding is typically not required to address the usual tasks associated with files or file types not found. Process 600 terminates thereafter (step 624).

When a "yes" is obtained in step 608, a determination is made as to a capability to obtain a decoder module (step 612). The decoder module contains the decoder files. When a needed decoder module, such as decoder files 310 of FIG. 3 is obtained, a "yes" results. When a decoder module cannot be obtained, a "no" results. When a "no" result is obtained in step 612, an error not found signal is raised (step 614). The error signal is forwarded by a notify caller operation, as previously described, in step 616.

When a "yes" is obtained in step 612, extract metadata from the attachment is performed to pull the descriptive information for the attachment (step 618). The extraction is performed using the decoder file specific to the file type of the attachment. Having extracted the needed information, an operation to generate an extensible markup language fragment is performed to produce the information in a readily usable format (step 620). For example, the extensible markup language fragment may be of the type represented in fragment 502 of FIG. 5 and stored in data instances 406 of FIG. 4.

Insert extensible markup language fragment into forms data then provides the placement of the desired information with the document and attachment to which the fragment refers (step 622). A package, such as package 420 of FIG. 4 thus created, may also be digitally signed if required. Process 600 terminates thereafter (step 624).

An illustrative embodiment provides an externalized representation of the descriptive information of the attachment. Using the process just described, descriptive information for an attachment may be extracted and processed into a standards-based output format externalized from the attachment for other components to use. The output may then be used in queries regarding the content of the attachment, allowing users to search for and retrieve information regarding the attachment.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose, hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications, as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory, employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for form attachment metadata generation, the computer implemented method comprising:
    receiving a request to attach an attachment to a document;
    calling an attachment metadata generator;
    extracting metadata from the attachment to form extracted data;
    generating an extensible markup language fragment from the extracted data; and
    inserting the extensible markup language fragment into the document.

2. The computer implemented method of claim 1, wherein the attachment metadata generator is called responsive to receiving the request from a user modifying the document, and wherein calling the attachment metadata generator further comprises the attachment metadata generator:
    calling a file type identifier to determine a file type of the attachment;
    responsive to a determination of a file type, identifying a decoder file, to form an identified decoder file; and
    determining whether the identified decoder file is obtained.

3. The computer implemented method of claim 2, wherein the decoder file implements a common application programming interface.

4. The computer implemented method of claim 2, further comprising:
    responsive to a determination of a file type not found, signaling an error not supported;
    responsive to a determination of a file type not found, notifying a caller;
    responsive to a determination that the identified decoder file is not obtained, signaling an error not found; and
    responsive to a determination that the identified decoder file is not obtained, notifying the caller.

5. The computer implemented method of claim 1, wherein the document is a multi-layered form document comprising a presentation layer, a business logic layer, a data instance layer, and a file attachment layer.

6. The computer implemented method of claim 5, wherein the calling the attachment metadata generator is triggered by an embedded control embedded in the business logic layer of the multi-layered form document.

7. A data processing system for form attachment metadata generation, the data processing system comprising:
    a bus;
    a memory connected to the bus, wherein the memory comprising computer-executable instructions;
    a communications unit connected to the bus;
    a display connected to the bus;
    a processor unit connected to the bus, wherein the processor unit executes the computer-executable instructions to direct the data processing system to:
    receive a request to attach an attachment to a document;
    call an attachment metadata generator;
    extract metadata from the attachment to form extracted data;
    generate an extensible markup language fragment from the extracted data; and
    insert the extensible markup language fragment into the document.

8. The data processing system of claim 7, wherein the attachment metadata generator is called responsive to receiving the request from a user modifying the document, and wherein the processor unit executes the computer-executable instructions to direct the data processing system to call the attachment metadata generator further comprises the attachment metadata generator:

calling a file type identifier to determine a file type of the attachment;

responsive to a determination of the file type, identifying a decoder file to form an identified decoder file; and determining whether the identified decoder file is obtained.

9. The data processing system of claim 8, wherein the decoder file implements a common application programming interface.

10. The data processing system of claim 8, further comprising:

executing the computer executable instructions to direct the data processing system to respond to a determination of a file type not found, and executing the computer executable instructions by the processor to signal an error not supported;

executing the computer executable instructions by the processor to notify a caller;

executing the computer executable instructions to direct the data processing system to respond to a determination of a decoder file is not obtained, executing the computer executable instructions by the processor to signal an error not found; and executing the computer executable instructions by the processor to notify the caller.

11. The data processing system of claim 7, wherein the document is a multi-layered form document comprising a presentation layer, a business logic layer, a data instance layer, and a file attachment layer.

12. The data processing system of claim 11 further comprises executing the computer executable instructions to direct the data processing system to call the attachment metadata generator triggered by an embedded control embedded in the business logic layer of the multi-layered form document.

13. A computer program product for form attachment metadata generation, the computer program product comprising a computer-readable recordable type medium tangibly embodying computer executable instructions thereon, the computer executable instructions comprising:

computer executable instructions for receiving a request to attach an attachment to a document;

computer executable instructions for calling an attachment metadata generator;

computer executable instructions for extracting metadata from the attachment to form extracted data;

computer executable instructions for generating an extensible markup language fragment from the extracted data; and computer executable instructions for inserting the extensible markup language fragment into the document.

14. The computer program product of claim 13, wherein the attachment metadata generator is called responsive to receiving the request from a user modifying the document, and wherein computer executable instructions for calling the attachment metadata generator further comprises:

computer executable instructions for calling a file type identifier to determine a file type of the attachment; and computer executable instructions responsive to a determination of a file type, for identifying a decoder file to form an identified decoder file; and determining whether the identified decoder file is obtained.

15. The computer program product of claim 14, wherein the decoder file implements a common application programming interface.

16. The computer program product of claim 14, wherein computer executable instructions responsive to a determination of a file type not found further comprise:

computer executable instructions for signaling an error not supported; computer executable instructions for notifying a caller; and wherein computer executable instructions responsive to a determination of a decoder file is not obtained further comprise:

computer executable instructions for signaling an error not found; and computer executable instructions for notifying the caller.

17. The computer program product of claim 13, wherein the document is a multi-layered form document comprising a presentation layer, a business logic layer, a data instance layer, and a file attachment layer.

18. The computer program product of claim 17, wherein computer executable instructions for calling the attachment metadata generator are triggered by an embedded control embedded in the business logic layer of the multi-layered form document.

19. The method of claim 1, further comprising:

attaching the attachment to the document and then digitally signing the document, wherein the attachment metadata generator is called responsive to attaching the attachment to the document.

20. The data processing system of claim 7, wherein the processor unit executes the computer-executable instructions to attach the attachment to the document and then digitally sign the document, wherein the attachment metadata generator is called responsive to attaching the attachment to the document.

* * * * *